March 4, 1969 — G. J. STALPH — 3,430,645
DUCT SUPPORT ARRANGEMENT
Filed June 19, 1967 — Sheet 1 of 2
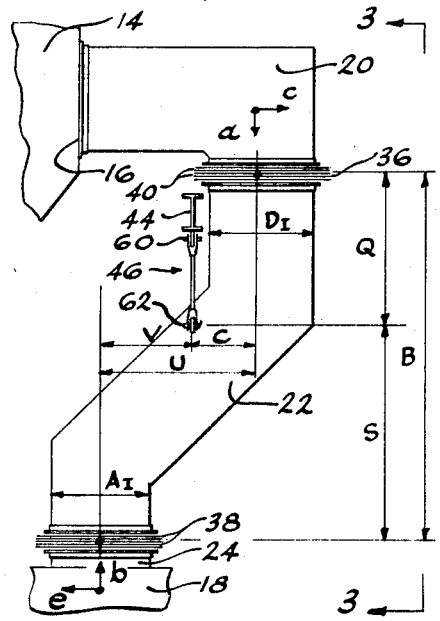
FIG-2
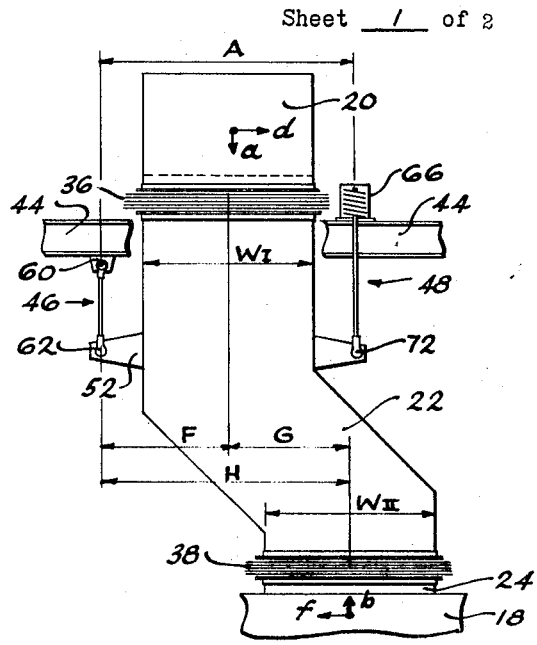
FIG-3
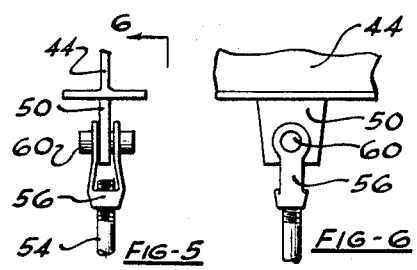
FIG-5  FIG-6
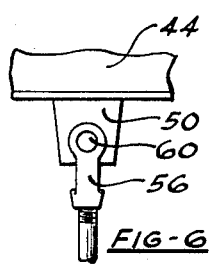
FIG-1
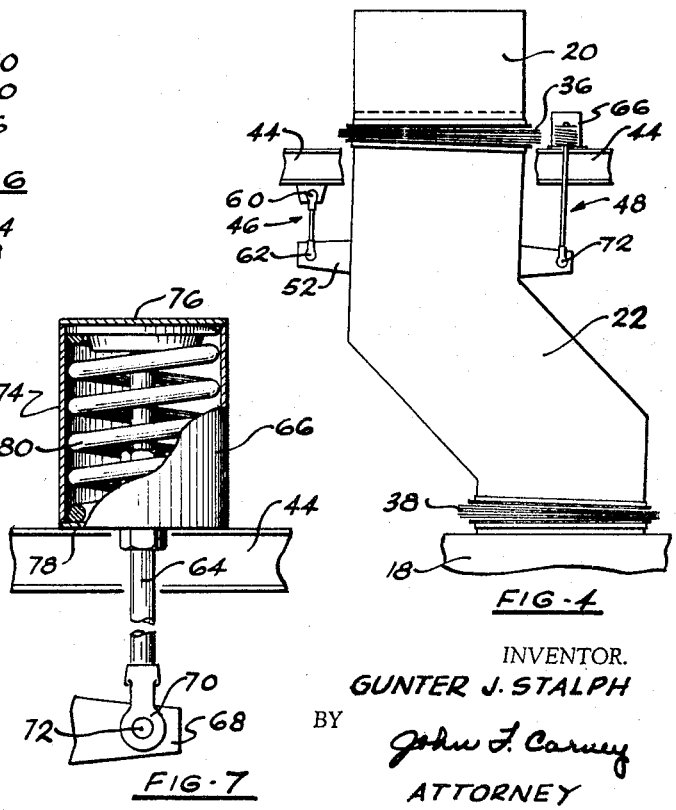
FIG-7
FIG-4
INVENTOR.
GUNTER J. STALPH
BY John L. Carney
ATTORNEY

United States Patent Office 3,430,645
Patented Mar. 4, 1969

3,430,645
DUCT SUPPORT ARRANGEMENT
Gunter J. Stalph, Windsor, Conn., assignor to Combustion Engineering, Inc., Windsor, Conn., a corporation of Delaware
Filed June 19, 1967, Ser. No. 647,148
U.S. Cl. 137—356
Int. Cl. F16l 3/16, 27/10, 43/00
6 Claims

ABSTRACT OF THE DISCLOSURE

Apparatus for mounting a gas-conducting duct section which is connected by means of expansion joints between pieces of equipment and subject to combinations of both linear and angular motion due to the relative thermal displacements occurring in the equipment. The duct section is supported in a manner that eliminates lateral shear stresses in the expansion joints and that permits accurate computations to be made for the design of bellows employed in the joints. This is accomplished by suspending the duct section from overhead structural steelwork by means of a pivotally attached stiff hanger on one side of the section and one or more spring hangers pivotally attached to the other side or sides thereof.

BACKGROUND OF THE INVENTION

In the design of vapor generating plants, or other similar heat exchange apparatus, sheet metal ducts are often employed to conduct gaseous fluids, such as air or combustion gas, from one plant component to another. A typical application is the duct system that connects the combustion gas discharge opening of a vapor generator to an air heater for the purpose of conducting heated combustion gases into heat exchange relation with incoming air. Because the vapor generator and the air heater are independently mounted and because they are subjected to different operating temperatures and therefore are subject to non-uniform thermal displacements, the duct system which interconnects the two pieces of equipment must undergo compound movements, known as toggling, during the various phases of plant operation. For this reason, it is common practice in vapor generating plants to include in the duct system a section which is connected into the system by means of expansion joints in order to absorb the non-uniform displacements that occur. This section, known as a toggle section, is most commonly connected into the system by means of bellows-type expansion joints in order that the joints will be rendered gas tight.

Where the toggle section has been a vertically oriented member connected by means of bellows joints between vertically spaced openings it has been the practice to merely suspend the section from overhead structural steelwork by means of a plurality of rigid hangers. It was the belief that any relative displacement that occurred between the connected pieces of equipment could be adequately absorbed by the bellows joints.

A problem arises due to the fact that the linear motion which occurs between the connected pieces of equipment will occur both axially of the joints and laterally thereof and it is well known that the lateral motion-absorbing capacity of bellows joints is limited due to the fact that each individual bellows section or pleat is extremely stiff in shear. In the past, the capacities of vapor generating plants were such that the size of the equipment was relatively small and the bellows joints could be designed on the basis of the axial deflections to which they were subjected without fear of the joints becoming overstressed in shear. More recently, however, the capacities, and thereby the size, of vapor generating plants have increased in the point where the duct systems which connect between the gas outlet of the vapor generator and the air heater have reached dimensional proportions of the order of 10 feet by 30 feet or more in section. This increase in the size of the equipment employed has created a concomitant increase in the amount of shear stress to which the bellows joints are subjected due to the relative lateral displacement that occurs between the pieces of equipment interconnected by the duct system. Oftentimes, failure of the joints has resulted.

Several solutions to this problem have been considered. It has been proposed to "soften" the joints and thereby render them less stiff in the lateral direction by adding a greater number of bellows sections. The addition of bellows sections to the joints, however, significantly increases the cost of the duct system. It has also been proposed to replace the stiff support hanger with spring hangers and thereby create a "floating" toggle section wherein the lateral restraint normally imposed by the stiff hangers would be eliminated, thus minimizing the shear stress occurring in the joints. This latter arrangement, while being quite adequate for the elimination of shear in the joints, is undesirable from the standpoint of the design of bellows joints since the movements of the toggle section and thereby the forces acting on the joints are extremely difficult to predict. Where such arrangements have been employed, it is necessary to over-design the bellows joints in order to provide a sufficient number of bellows sections in the joints to insure safe operation. This therefore results in needless additional expense in the cost of the duct system.

SUMMARY OF THE INVENTION

According to the present invention a simple toggle section hanger arrangement is provided which alleviates the above-mentioned problems with little additional cost. The invention involves the employment of a plurality of suspension hangers for supporting a vertically extending duct section which is bellows-connected between two parallel gas openings. One of the hangers is a stiff hanger that is pivotally secured at its upper end to the overhead structural steelwork and at its lower end to the duct section. The other hanger or hangers, depending on the weight of the duct section, are expansible hangers which are spring supported at their upper end to the overhead steelwork and pivotally attached at their lower end to the duct section.

By supporting the toggle section in this manner the hanger rods can be arranged such that the shear force on the bellows joint developed due to the thermal displacements that occur in the equipment is zero when the plant reaches its operating temperature. The amount of shear to which the joint is subjected is then dependent only upon those forces created by the internal pressure of the fluid that is conducted by the duct. Since these forces represent only a fraction of the total forces present in the bellows joints, the amount of shear stress to which the joints are subjected can be greatly reduced.

Moreover, because the length of the stiff hanger is fixed, the movement that will occur in the toggle section can be predicted by employing simple geometric and trigonometric considerations. Thus the number of bellows sections required in each of the joints to give satisfactory performance can be more accurately determined.

DESCRIPTION OF THE DRAWINGS

FIGURE 1 is a schematic representation of a vapor generator connected to an associated air heater by means of a typical duct system;
FIGURE 2 is an enlarged view of the duct system shown in FIGURE 1 provided with a structural support arrangement according to the present invention;

FIGURE 3 is a view of the duct system taken along line 3—3 of FIGURE 2;

FIGURE 4 is a view similar to FIGURE 2 illustrating the toggle section in its displaced position;

FIGURE 5 is a detailed illustration of the fixed hanger employed in the preferred embodiment of the invention;

FIGURE 6 is a view taken along line 6—6 of FIGURE 5;

FIGURE 7 is a detailed illustration of the spring hanger employed in the invention;

DESCRIPTION OF THE PREFERRED EMBODIMENT

Figures 10, 11:
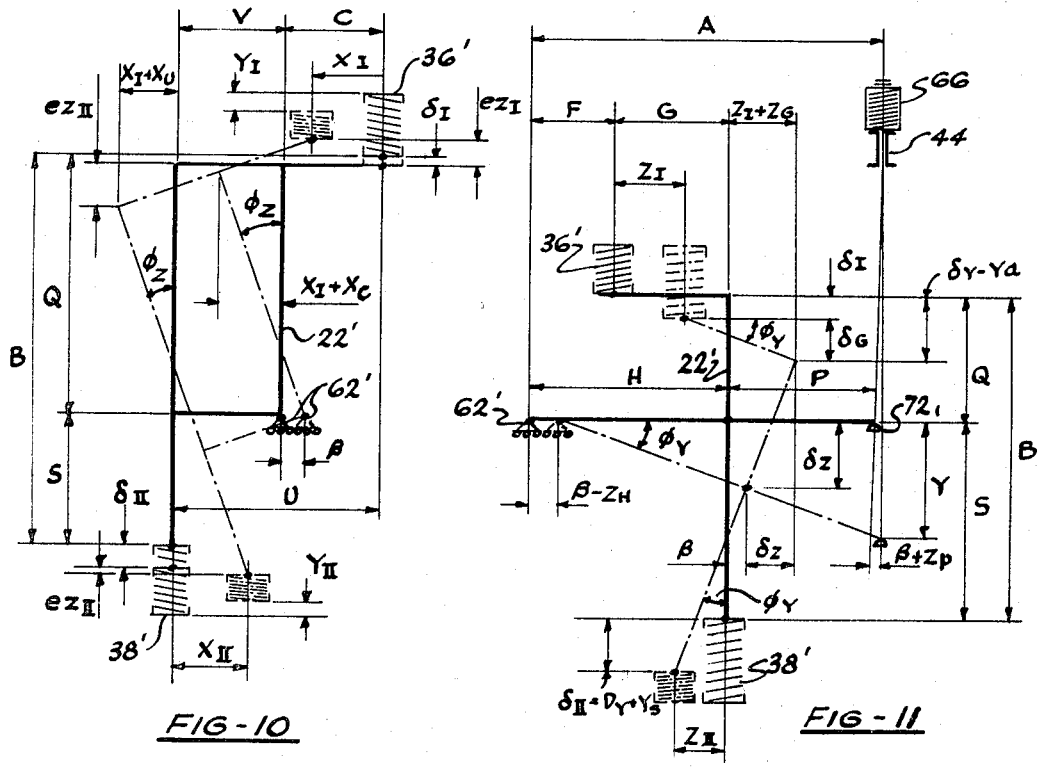
FIGURE 10 is a schematic representation of a toggle section before and after displacement occurs illustrating the geometric considerations to be made for the purpose of designing the bellows joints employed in the invention.
FIGURE 11 is a view similar to FIGURE 10 taken along line 11—11 of FIGURE 10.

Referring now to the drawings wherein like reference characters are employed throughout to designate like elements, FIGURES 1 through 4 schematically illustrate a vapor generator 10 including a furnace 12 and rear gas pass 14 wherein the gas outlet 16 in the rear pass is connected to a regenerative air heater 18 by a fluid duct system. The duct system comprises duct sections 20 and 22 which are both rectangular in section with the former being horizontally disposed and fixedly secured to the gas outlet 16 while the latter, hereinafter referred to as the toggle section, is a vertically extending member which forms a flexible connection between the duct section 20 and the gas inlet, indicated as 24, of the air heater 18. The vapor generator 10, as is generally the case with large capacity units, is mounted by suspending the tubular walls thereof from overhead structural steelwork, indicated as 26, by means of vertical support hangers 28. The air heater 18, on the other hand, is a bottom supported device that is mounted on a fixed foundation by means of support members 30.

Due to changes in temperature which occur in plants of this nature between shutdown conditions and those of full load operation, thermal expansion of the pressure parts of both the vapor generator 10 and air heater 18 will occur. As the temperatures increase from no load to full load operation, the tubular walls of the vapor generator will be caused to expand downwardly from the steelwork 26 as indicated by the arrow $a$ in FIGURE 2 and the air heater 18 will expand upwardly from its supports 30 as indicated by the arrow $b$. Additionally, because the vapor generator 10 and air heater 18 are commonly constructed so as to have a point or line of zero expansion from which all lateral expansion occurs, here indicated in FIGURE 1 as lines 32 and 34, respectively, lateral expansion in the vapor generator will occur in one plane as indicated by the arrow $c$ in FIGURE 2 and in the plane normal to that in FIGURE 1 as indicated by the arrow $d$ in FIGURE 3. That expansion in the air heater 18 will occur as indicated by the arrows $e$ and $f$ in FIGURES 2 and 3, respectively. The displacements that occur in the pieces of equipment due to thermal elongation are such as to cause the connecting toggle section 22 to be physically displaced from its cold position by undergoing angular movement as indicated in FIGURE 4. This displacement of the toggle section 22 is accommodated by connecting the section between the opening in duct 20 and the gas inlet 24 of the air heater 18 by means of expansible joints 36 and 38.

In order that the joints be gas tight it is common practice to form them as bellows-type joints. These joints are normally rectangular in section and have a plurality of corrugations 40, the number of which vary according to the degree of stress to which the respective joints will be subjected. A preferred form of bellows-type joint contemplated for use in the present invention is shown and described in co-pending patent application Ser. No. 556,185, to K. S. Svendsen, filed June 8, 1966. The bellows joints 36 and 38 are connected between the ends of the toggle section 22 and the adjacent pieces of equipment in any suitable manner, as by means of welding or by threaded fasteners.

According to the invention, vertical support for the toggle section is obtained by supporting it from or upon its support base by means of vertical support struts, one of which is a member having a fixed length that is pivotally connected at its ends to both the toggle section and the support base. The remaining support struts, either one or more, are spring members attached at one end of the support base and pivotally connected at the other end to the toggle section. By supporting the toggle section in this manner the number of bellows necessary to form each expansion joint can be readily calculated disregarding the magnitude of the forces acting on the joints and by employing only geometric or trigonometric considerations. Moreover, the spring members can be adjusted such that the reaction at its connection with the toggle section opposes the shear force generated in the bellows when the toggle section is in its hot position so as to render the bellows free from shear stress during full load operation of the unit.

In the disclosed embodiment of the invention vertical support for the toggle section 22 is obtained by suspending it from overhead structural steelwork 44. Suspension of the toggle section is accomplished by means of vertical hangers, the exact number of which to be employed is determined by the weight of the toggle section and the forces acting on it. In accordance with the teaching of the invention, however, one of the hangers, here shown as member 46, is a stiff hanger while the other hanger 48 is a spring hanger. In the illustrated embodiment only one spring hanger is deemed necessary since a pair of hangers can adequately support a conventional toggle section for high capacity vapor generators, i.e. one having dimensions of the order of 10 feet by 30 feet. The invention is, however, equally applicable where stress conditions require the use of more than a pair of hangers, in which case the additional hangers are in the form of spring hangers similar to that illustrated at 48.

The hanger arrangement comprising the stiff hanger 46 includes an apertured bracket 50 which may be formed of an angle member or the like weldedly or otherwise secured to the underside of the overhead structural steelwork 44. Another apertured bracket 52 is suitably connected to the wall of the toggle section 22. A rigid rod 54 provided at its ends with clevices 56 and 58 is connected between the brackets by means of pivot pins 60 and 62, respectively. By means of this arrangement the toggle section 22, when it is caused to undergo physical movement, is permitted to pivot about the pivot pin 62 and the rod 54 is enable to pivot about the pin 60.

The spring hanger 48 is mounted on the opposite side of the toggle section 22 from the stiff hanger 46 in substantially, although not necessarily, the same plane as the stiff hanger. It is desirable that the hangers be positioned such that the spring hanger is located on that side of the toggle section where its point of support, that is the pin 72, moves down as the section undergoes angular motion. The spring hanger 48 in the illustrated embodiment comprises a hanger rod 64 including a support spring assembly 66 connected between the overhead steelwork 44 and a bracket 68 similar to the bracket 52. The rod 64 is pivotally secured to the bracket 68 by means of a clevis 70 that is secured to the bracket by means of a pin 72. The spring hanger 48 is one that can accommodate the toggle-type movement of the section 22, yet at the same time maintain a supporting engagement with the section that will keep the rod 64 always in tension.

The support spring assembly 66 disclosed herein comprises a housing 74 including top and bottom closure plates 76 and 78, respectively, which enclose a coil-type compression spring 80. The coil spring 80 for use in each application is preselected to provide a spring constant that can undergo the requisite amount of deflection necessary to permit the toggle section to move and at the same time create a reactive force when the toggle section is in its hot position that opposes the shear forces generated in the bellows due to the weight of the toggle section and the thermal displacement of the connected pieces of equipment. A load flange 82 is supported upon the spring 80 and connects the upper end of the hanger rod 64 in a manner such that when the hanger is loaded the spring will be compressed.

The operation of the disclosed vapor generator plant is as follows. When fuel is burned in the furnace 12 of the vapor generator 10, combustion gases are created which flow in heat exchange relation to the vaporizable liquid passing through the pressure parts of the unit to create vapor which may be supplied to do useful work such as operating the turbine of a turbo-generator apparatus. The combustion gases flow through the plant from the furnace 12, through the rear pass 14 and out opening 16 into the duct system which includes the fixed duct section 20 and toggle section 22. From the duct system the gases pass into the air heater 18 through its gas inlet 24 in order to impart heat to incoming air which is to be supplied to the firing system of the vapor generator 10 through another duct system indicated as 21. From the air heater 18 the combustion gases are discharged from the plant through a stack (not shown).

As the plant's operating temperatures are increased from startup to full load conditions, the various pieces of equipment are caused to undergo thermal expansion. This expansion occurs in three dimensions as indicated by the arrows *a* through *f* in FIGURES 2 and 3 and results in relative displacement of the openings 21 and 24 in the fixed duct section 20 and air heater 18, respectively, between which the toggle section 22 is connected. Because of the movements which occur in the connected pieces of equipment the toggle section 22 is caused to undergo physical displacement. This displacement occurs as a compound movement including both substantially horizontal and angular displacements of the section from its original position. In the arrangement disclosed herein the toggle section 22, due to the relative lateral and vertical expansions that occur in the vapor generator 10 and air heater 18, will move laterally toward the right from its original position and will also undergo a clockwise angular movement. The former movement is due to the fact that the horizontal component of expansive displacement of the fixed duct section 20 which is attached to the vapor generator 10 is greater than that of the air heater 18. The latter resultant movement is due to the fact that the vertical component of displacement of the opening 21 in the fixed duct section 20 is greater than that of the gas inlet opening 24 in the air heater 18.

Because the forces acting on the duct system are transmitted to the toggle section 22 through the bellows joints 36 and 38, these joints must be designed to withstand the stresses imposed by these forces. By means of the manner by which the toggle section 22 is mounted as taught by the present invention the design of the bellows joints is enhanced in two important respects. First, because a stiff hanger 46 having a fixed linear dimension is employed to mount one side of the toggle section 22 and because movement of the hanger is contained due to the fact that it is pivotally connected at its ends between the overhead structural steel 44 and the bracket 52, the motion which occurs in the toggle section and therefore the amount of deflection experienced by the bellows joints can be accurately predicted. Secondly, because the remaining hanger or hangers from which the toggle section 22 is suspended are spring hangers the reactive force at the pin connection 72 can be preselected to oppose the forces acting on the bellows joints such that the maximum shear stress to which the joints are subjected, which stress occurs when the plant reaches full load operation at which time the toggle section 22 is said to have achieved its "hot position," is eliminated. The use of springs also permits the pin connection 72 to exert a reactive force when the toggle section is in its "cold" or original position such that excessive stresses are not produced in the bellows.

Figure 8:
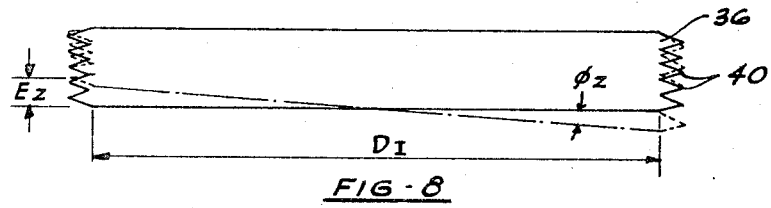
FIGURE 8 is a detailed illustration of one of the bellows joints before and after displacement.
Figure 9:
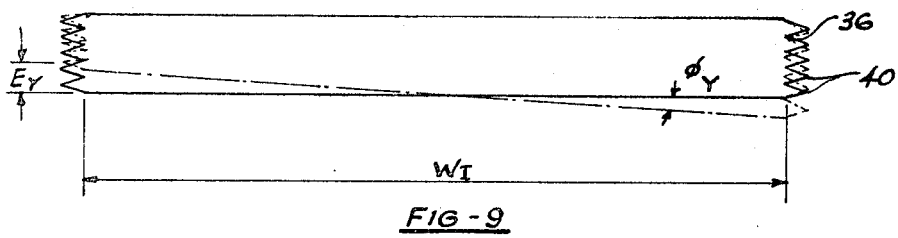
FIGURE 9 is a view similar to FIGURE 8 taken along line 9—9 of FIGURE 8.

The manner by which the bellows-joints 36 and 38 are calculated is as follows. FIGURES 8 and 9 illustrate a typical joint, taken as the joint 36, and the deflections it undergoes in the planes corresponding to those of FIGURES 2 and 3. FIGURES 10 and 11 illustrate the movements which occur in the respective planes in a rigid body 22' that corresponds to the toggle section 22. The capital letters denoting dimensions of the rigid body 22' in FIGURES 10 and 11 correspond to those illustrated in FIGURES 2 and 3 with relation to the toggle section 22. The springs 36' and 38' correspond to the bellows joints 36 and 38 and the points of support of the body 22' are indicated by supports 62' and 72'. These supports correspond to the pin connections 62 and 72 employed to support the toggle section 22 of FIGURES 2 and 7. It should be noted that support 62' is shown in FIGURES 10 and 11 as a point that is freely movable in the horizontal direction and about which the body 22' undergoes pure rotational movement. This assumption is made due to the manner in which the toggle section 22' is supported by the stiff hanger 46 with the latter being pivotally connected at its ends to the structural steelwork 44 and the bracket member 52 by means of the connecting pins 60 and 62, respectively. This assumption, while not being absolutely true since the hanger rod 54 pivots about pin 60 and therefore the pin connection 62 undergoes arcuate movement, is nonetheless proper in view of the fact that in actual practice the hangers 46 in most applications will be upwards of 10 feet in length while the lateral movement imposed upon the pin 62 will be less than 3 inches. The movement of the pin 62 is so slight with relation to the length of the hanger rod that it can therefore be taken as being linear without detracting from the accuracy of the calculations.

Going now to the calculations, the number of corrugations 40 necessary in the construction of the bellows that comprises each of the joints 36 and 38 is a function of the motion or deflection that occurs in each, and can be determined by the equation (1) $$N = M/\Delta$$

where N is the number of corrugations 40; M is the maximum motion occurring in the joint; and $\Delta$ is the allowable deflection permitted per corrugation.

The maximum motion M in the above equation is determined by the following equation:

(2) $$M = |E_y| + |E_z| + |e|$$

where $E_y$ and $E_z$ are the maximum movements occurring at the corners of the joints due to motion of the toggle section 22 (FIGURES 8 and 9); and $e$ is the linear movement that occurs in the joint. As shown in FIGURES 8 and 9 the maximum movements occurring at the joint corners can be calculated according to the following:

$$\tan \phi_y = \frac{E_y}{W/2}$$

and $$\tan \phi_z = \frac{E_z}{D/2}$$

Since, however, the angles involved are so slight, i.e. normally being less than 3 degrees, the tangents of the angles can be equated to the sines of the angles and also to the angles themselves expressed in radians. These equations can therefore be written as:

(3) $$E_y = \frac{W}{2}\phi_y$$

and (4) $$E_z = \frac{D}{2}\phi_z$$

where W and D are the sectional dimensions of the bellows joint and the angles $\phi$ represent the maximum angular movement of the toggle section 22 in the planes of FIGURES 10 and 11, respectively.

The angle $\phi_y$ can be calculated from analysis of FIGURE 10 by the equation:

(5) $$\phi_y = \frac{Z_I Z_G Z_{II}}{B}$$

where $Z_I$ and $Z_{II}$ are the horizontal displacements of the respective ends of the toggle section 22 due to the displacement of the openings 21 and 24 in the duct section 20 and air heater 18 occasioned by thermal expansion of these pieces of equipment. These displacements can be calculated knowing the horizontal distance between the openings and the respective lines of zero expansion, 32 or 34, with which they are associated; the maximum temperatures to which the pieces of equipment will be subjected; and their coefficients of thermal expansion. $Z_G$ is the horizontal elongation of the dimension G due to thermal elongation of the toggle section and can be calculated knowing the dimension G, the maximum temperature to which the toggle section will be subjected and its coefficient of thermal expansion.

Similarly the angle $\phi_z$ can be calculated from analysis of FIGURE 11 by the equation (6) $$\phi_z = \frac{X_I + X_u + X_{II}}{B}$$

where $X_I$ and $X_{II}$ are the horizontal displacements of the respective ends of the toggle section 22 due to displacement of the openings 21 and 24 in the duct section 20 and air heater 18 occasioned by these pieces of equipment. They are calculated in the same manner as the calculations for $Z_I$ and $Z_{II}$ are made with the exception that the distance measured from the lines 32 and 34 of zero expansion are those which are normal to the plane of FIGURE 10. $X_u$ is the horizontal elongation of dimension U due to thermal expansion of the dimension.

Referring now to FIGURE 11, the linear motions $e_I$ and $e_{II}$ are calculated by the following equations:

(7) $$e_I = e_{zI} + \delta_I + y_I$$

(8) $$e_{II} = e_{zII} + \delta_{II} + y_{II}$$

where $e_z$ is the deflection occurring in the respective joints due to pivotal movement of the toggle section in the plane of FIGURE 11; $\delta$ is the deflection occurring in these joints due to pivotal movement of the toggle section in the plane of FIGURE 10; $y$ is the deflection in the joints resulting from thermal expansion of the respective pieces of equipment in the vertical direction. The deflections $y$ can be calculated knowing the vertical distance between the openings 21 and 24 and their points of zero expansion, steelwork 26 and support columns 30, respectively; the maximum temperature to which the respective pieces of equipment are to be subjected; and their respective coefficients of thermal expansion.

Analysis of FIGURE 11 indicates that $e_{zI}$ can be calculated by the equation $$\tan \phi_z = e_{zI}/c$$

but since tan $\phi_z$ equals $\phi_z$ this equation can be written as (9) $$e_{zI} = c\phi_z$$

Also from FIGURE 11 $e_{zII}$ is calculated from the equation:

$$\tan \phi_z = e_{zII}/V$$

but since tan $\phi_z = \phi_z$ this equation can be written as:

(10) $$e_{zII} = V\phi_z$$

The deflections $\delta_I$ and $\delta_{II}$ are calculated by reference to FIGURE 10 where analysis shows that:

(11) $$\delta_I = \delta_y - y_Q - \delta_G$$

and

(12) $$\delta_{II} = \delta_y + y_s$$

Since tan $\phi_y$ equals $\delta_y/H$ and also $\delta_G/G$ Equation 11 can be written as:

$$\delta_I = H\phi_y - G\phi_y - y_Q = (H-G)\phi_y - y_Q$$

but because $H - G = F$ this equates to:

(13) $$\delta_I = F\phi_y - y_Q$$

where $y_Q$ is the thermal elongation of the dimension Q. Similarly, Equation 12 can be written:

(14) $$\delta_{II} = H\phi_y + y_s$$

where $y_s$ is the thermal elongation of the dimension $s$.

Now therefore Equations 7 and 8 can be rewritten as

(15) $$e_I = c\phi_z + (F\phi_y - y_Q) + y_I$$

and

(16) $$e_{II} = V\phi_z + y_s + H\phi_y + y_{II}$$

And since all of the values required to satisfy Equations 1 and 2 are now readily available the number of corrugations to be employed in the bellows of joint 36 can be obtained as follows:

(17) $$M_I = |E_{yI}| + |E_{zI}| + |e_I|$$

(18) $$E_{yI} = \frac{W_I}{2}\phi_y$$

(19) $$E_{zI} = \frac{D_I}{2}\phi_z$$

(20) $$N_I = M_I/\Delta$$

And similarly for joint 38

(21) $$M_{II} = |E_{yII}| + |E_{zII}| + |e_{II}|$$

(22) $$E_{yII} = \frac{W_{II}}{2}\phi_y$$

(23) $$E_{zII} = \frac{D_{II}}{2}\phi_z$$

(24) $$N_{II} = M_{II}/\Delta$$

The next factor to be determined is the selection of the compression spring 80 for use in the support spring assembly 66. This can be calculated by first determining the reactive force at the spring hanger connection 70 necessary to offset the forces generating the lateral shear stress which occur in the bellows joints when the toggle section 22 is in its "hot" position. This reactive force can readily be calculated through the use of conventional force-deflection equations:

(25) $$\epsilon F_x = 0$$

(26) $$\epsilon F_y = 0$$

(27) $$\epsilon M = 0$$

taking into consideration the forces acting on a free-body diagram of the toggle section in its "hot" position. By equating the shear forces to zero in these equations the amount of reactive force necessary to produce this result can be calculated. Another set of force-deflection equations is employed taking into consideration the forces acting on a free-body diagram of the toggle section 22 in its "cold" original position. Then, knowing that:

(28) $$R_c = R_H \pm \Delta R$$

where $R_c$ is the "cold" reaction; $R_H$ is the "hot" reaction; and $\Delta R$ is the change in reactive force produced by deflection of the spring 80, and also that:

(29) $$\Delta R = K\lambda$$

where K is the spring constant, and $\lambda$ is the total deflection of the support spring 80, the following equation can be written:

(30) $$K\lambda = \pm(R_c - R_H)$$

Since the total spring deflection $\lambda$, can be obtained by analysis of FIGURE 10 wherein it can be seen that:

$$\tan \phi_y = \lambda/A$$

This equation can be written as:

(31) $$\lambda = A\phi_y$$

so that the spring constant, K, necessary to produce the desired result can be readily obtained.

It will thus be appreciated that with the invention there is provided apparatus for supporting a toggle section in a duct system subject to compound movements due to the relative thermal displacements between the pieces of equipment connected by the duct system in a manner such that the bellow joints connecting the toggle section to the equipment can be relieved of shear stress when the vapor generator plant in which the apparatus is installed is at full load operation. It should be further appreciated that the herein described invention also permits accurate design of bellows joints by simple geometrical analysis such that the costs of a duct system due to overdesign of the bellows joints can be eliminated.

What is claimed is:
1. In a duct system for connecting vertically spaced openings in pieces of equipment, the combination of:
 (a) a vertically extending toggle section subject to compound movement due to the imposition of external forces thereon;
 (b) bellows-type expansion joints connecting the ends of said toggle section to the respective openings in said pieces of equipment;
 (c) means for vertically mounting said toggle section comprising:
  (i) a stationary support base independent of said duct system and said pieces of equipment,
  (ii) elongated support struts in supporting engagement between said support base and said toggle section, said support struts including:
   (aa) a single stiff strut having a fixed linear dimension connecting between said support base and said toggle section,
   (bb) and at least one spring strut having an expansible linear dimension spaced from said stiff strut and connecting between said support base and said toggle section.

2. Apparatus as recited in claim 1 wherein said support struts comprise elongated members pivotally connected to said toggle section.

3. Apparatus as recited in claim 2 wherein said stiff strut is additionally pivotally connected to said support base.

4. Apparatus as recited in claim 3 wherein said spring strut is disposed on that side of the toggle section that undergoes downward movement when said toggle section is acted upon by said external forces.

5. Apparatus as recited in claim 4 wherein said spring strut includes spring means having a spring constant that will generate a reactive force at the point of connection between said spring strut and said toggle section that is capable of offsetting the lateral shear forces present in said bellows-type joints when said toggle section is in its position of maximum displacement.

6. Apparatus as recited in claim 5 wherein said support base comprises overhead structural steelwork and said support struts comprise hanger rods for suspending said toggle section from said overhead structural steelwork.

References Cited
UNITED STATES PATENTS

| | | | |
|---|---|---|---|
| 787,870 | 4/1905 | Aden | 285—61 X |
| 2,335,478 | 11/1943 | Bergman | 285—226 X |
| 2,439,067 | 4/1948 | Wood | 248—54 |
| 2,929,397 | 3/1960 | Sloan et al. | 285—61 X |

FOREIGN PATENTS

| | | |
|---|---|---|
| 111,883 | 7/1962 | Pakistan. |

CARL W. TOMLIN, *Primary Examiner.*

DAVE W. AROLA, *Assistant Examiner.*

U.S. Cl. X.R.

248—54; 285—61, 179, 226

UNITED STATES PATENT OFFICE
CERTIFICATE OF CORRECTION

Patent No. 3,430,645                                            March 4, 1969

Gunter J. Stalph

It is certified that error appears in the above identified patent and that said Letters Patent are hereby corrected as shown below:

Column 2, line 2, "in" should read -- to --. Column 6, line 73, that portion of the formula reading "$E_s$" should read -- $E_z$ --. Column 7, formula 5, that portion of the formula reading "$Z_I Z_G Z_{II}$" should read -- $Z_I + Z_G + Z_{II}$ --. Column 7, line 28, "distance" should read -- distances --; line 63, before the letter "y" insert -- and --. Column 8, formula 18, that portion of the formula reading $$\frac{W_I}{2\phi y} \quad\quad \text{should read} \quad\quad \frac{W_I}{2}\phi y$$

Column 9, line 32, "bellow" should read -- bellows --.

Signed and sealed this 5th day of May 1970.

(SEAL)
Attest:

EDWARD M. FLETCHER, JR.                          WILLIAM E. SCHUYLER, JR.
Attesting Officer                                      Commissioner of Patents